No. 857,562. PATENTED JUNE 18, 1907.
R. K. LE BLOND & W. F. GROENE.
SPEED CHANGING DEVICE.
APPLICATION FILED JULY 8, 1905.

Witnesses:
O. W. Edlin.
A. R. Hunter

Inventors.
Richard K. LeBlond.
William F. Groene.
By Robt. P. Hains, Atty

UNITED STATES PATENT OFFICE.

RICHARD K. LE BLOND AND WILLIAM F. GROENE, OF CINCINNATI, OHIO.

SPEED-CHANGING DEVICE.

No. 857,562.  Specification of Letters Patent.  Patented June 18, 1907.

Application filed July 8, 1905. Serial No. 268,845.

*To all whom it may concern:*

Be it known that we, RICHARD K. LE BLOND and WILLIAM F. GROENE, citizens of the United States, residing at Cincinnati, in the county of Hamilton and State of Ohio, have invented certain new and useful Improvements in Speed-Changing Devices, of which the following is a specification.

The invention to be hereinafter described relates to speed-changing devices, and more particularly to that general type shown and described in Patent No. 788,658, granted to us May 2, 1905, whereby a wide range of different speeds can be transmitted from a primary or driving shaft through a simple arrangement of intermediate connections to the parts to be driven.

It frequently becomes necessary, not only to change the speed of parts in a device of the general character of Patent No. 788,658, but to reverse the direction of movement of the driven part, particularly in the case of machine-tools and lathes. In our previous patent, when such reversal became necessary while the parts were being driven through the initial speed, two movements were required to secure the desired results, and, as one of the objects of the present invention, we have sought to simplify said speed changing device in this and other respects, so that while a wide range of varying speeds are possible, the device can be readily and simply manipulated to run the same, either backward or forward.

With these generally stated objects in view, the invention consists of the parts and combinations hereinafter described and definitely pointed out in the claims.

Figure 1:
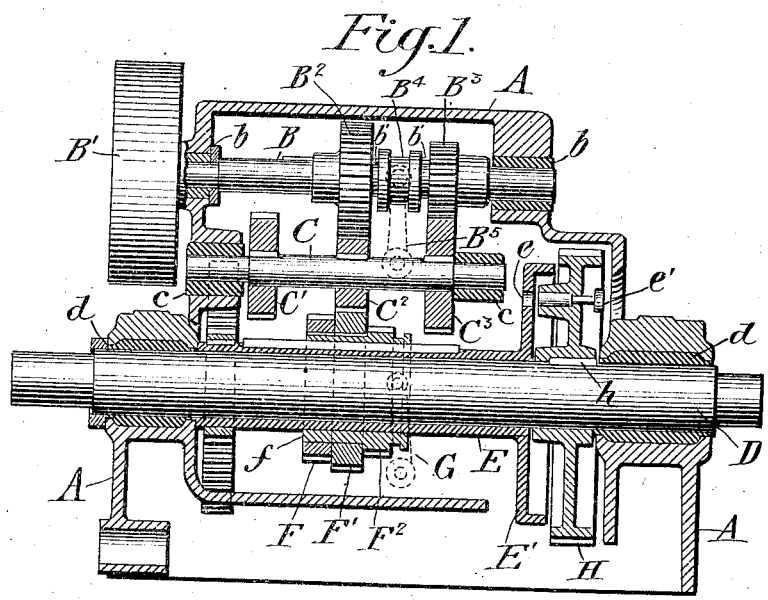
Figure 2:
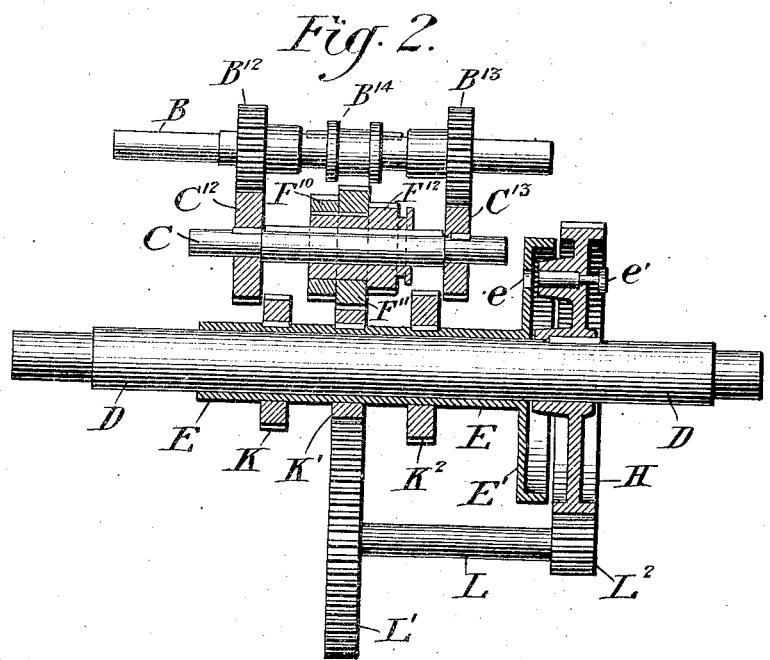

In the drawing, Figure 1 is a central vertical longitudinal section of the speed changing device in its simple form, only so much of the adjunctive parts being shown as are necessary to show the essentials of structure, and Fig. 2 is a similar view of a modified form of the invention, the casing being omitted and the parts developed to disclose the structural essentials.

In the drawings, which show the invention as applied to a machine tool for driving the spindle shaft at varying speeds, A represents the casing or frame-work for suitably supporting and covering the operative parts, and such casing may be similar to that described in our previous patent, No. 788,658.

Suitably journaled in bearings $b$ $b$ in the upper part of the casing A is the driving shaft B, which may, as in said patent, be driven from any convenient or suitable source of power through the pulley $B'$.

Loosely mounted on the driving shaft B, are the two prime or driving gears $B^2$ and $B^3$, either of which may be operatively connected to the driving shaft, as desired by means of the sleeve, splined to but movable longitudinally on the driving shaft, and provided with friction faces $b'$, $b'$, which, in effect, constitute the sliding member of a double friction clutch disposed between the two prime or driving gears, $B^2$ and $B^3$, so that, by moving this double friction member into frictional engagement with one or the other of the gears $B^2$ or $B^3$, by a suitable device $B^5$, shown in dotted lines, either one of said gears may be made to rotate with the driving shaft B, as will be obvious. The detailed construction of the double friction clutch member is quite immaterial and, being a well known machine element, its particulars of specific structure need no illustration or description.

Suitably journaled in bearings $c$ $c$ is the shaft C, which, for identification, may be denominated the intermediate or transmitting shaft. Secured to the transmitting shaft C are the series of gears $C'$, $C^2$ and $C^3$ of different diameters, with two of which the prime or driving gears $B^2$ and $B^3$ are in constant engagement. From this simple arrangement, it will be noted the transmitting shaft C will be driven from the gear $B^2$ or $B^3$, according to which of these gears is, for the time being, connected to the driving shaft by the clutch member $B^4$, the others of said gears $B^2$ or $B^3$ running idle, but yet in engagement with its gear on the transmitting shaft.

Mounted to turn in suitable bearings $d$ $d$ of the casing or frame is the spindle shaft D, to which varying speeds are to be transmitted for application to the particular work in hand. Loosely mounted upon the spindle shaft D is the sleeve E, extending nearly the length of the spindle shaft between its bearings $d$ $d$. Mounted upon the sleeve E and splined thereto so as to rotate with and be movable longitudinally on said sleeve E are the slip gears F, $F'$ $F^2$, said slip gears being rigidly connected in any suitable manner so as to rotate in unison. The particular construction shown for the slip gear connection comprises the gear F², having an extended sleeve portion f, and on this extended sleeve portion are keyed the two gears F F', said slip gears being movable longitudinally of the sleeve E while rotatable therewith, by means of a suitable hand operated device G, similar in this respect to the device for like purposes shown and described in our previous patent. The size of the gears F F' F² is such that one of said slip gears may be moved into engagement with its complemental gear on the intermediate shaft C, so that, rotary motion being imparted to the intermediate shaft C, it may be transmitted from said shaft through any one of the intermediate gears C', C² and C³, to the slip gears, and from said slip gears, this variable speed is, of course, transmitted to the sleeve E. In order that the variable motions thus imparted to the sleeve E, which is loosely mounted on the spindle shaft, may be transmitted to the spindle shaft direct, the said sleeve is provided at one end with a disk E' having a hole or perforation $e$, adapted to receive a movable locking-pin $e'$, carried by a face gear H, fixed to the spindle shaft D in any suitable manner, as by spline or key $h$, so that the spindle shaft and face gear H shall rotate together. From this construction, it will be apparent that the variable motions given to the sleeve through the driving gears, the intermediate gears and the slip gears may be directly transmitted to the spindle shaft D by engaging the locking pin $e'$ with the perforation or hole $e$ in the disk E'. Variable speeds thus imparted to the sleeve E may be transmitted to the spindle in a still further varying speed motion by means of the back gears. We have not deemed it necessary in this present case to specifically describe the back gears and eccentric mounting of the back shaft, as such construction in the present case is the same in all respects as shown and described in our previous patent, No. 788,658, Fig. 3 thereof, to which reference has been made.

We have thus described a simple, convenient and readily manipulated speed changing structure which may be rotated either backward or forward, as desired, by simple hand manipulation of the driving instrumentalities, and wherein the speeds may be readily changed, either by the double friction clutch member B⁴ or by the slip gears movable into engagement with the intermediate gears selectively, on the intermediate shaft; and, while this particular construction is found desirable and efficient, it is to be understood that changes may be made therein within the scope of the present invention. Without attempting to illustrate and describe all the changes that may be made, we have shown in Fig. 2 one modified form of the invention, in which the driving shaft has mounted on it loosely the two gears $B^{12}$ and $B^{13}$, corresponding to gears $B^2$, $B^3$, of Fig. 1, and, as in said Fig. 1, the double clutch member $B^{14}$ is splined to the driving shaft, making either of these gears operative with the shaft. In the modified form of invention, instead of mounting the slip gears on the sleeve E, as in Fig. 1, we mount said slip gears upon the intermediate shaft, as shown in Fig. 2, and spline the slip gears to said intermediate shaft C. The slip gears in Fig. 2 are designated as $F^{10}$, $F^{11}$, $F^{12}$, and secured to the intermediate shaft at each side of the slip gears are two transmitting gears $C^{12}$ and $C^{13}$, said intermediate gears being in constant engagement with the driving gears $B^{12}$ and $B^{13}$ respectively on the driving shaft. Upon the sleeve E, Fig. 2, are fixedly secured the gears K, K', K², suitably spaced apart and varying in size so as to be engaged each by its complemental gear $F^{10}$, $F^{11}$, and $F^{12}$ of the slip gears, whereby motion imparted to the intermediate shaft C may be transmitted in varying manner, as will be understood by those skilled in the art, to the sleeve E.

As in Fig. 1, so in Fig. 2, there is a face gear H, secured to the spindle shaft, and it may be connected to the sleeve E by the pin $e'$, and hole $e$ in the disk E', to drive the spindle shaft directly from the sleeve. We have shown, also, in Fig. 2 in a developed condition the back shaft L, corresponding to the back shaft as described in our previous patent, and this back shaft L is provided with gears of varying size, L', L², whereby the varying speeds given to the sleeve E may be transmitted through the back shaft from one of the gears K' on the sleeve to the face gear H along the shaft, the pin $e'$ at such times being out of engagement with the hole $e$ of the disk E', substantially as disclosed and described in our previous patent.

Of course, it will be understood that various changes in the form, disposition and relation of parts may be made within the scope of our invention.

Having thus described my invention, what I claim as new and desire to secure by Letters Patent of the United States is:

1. In combination, a driving shaft, a driven shaft, an intermediate shaft, a series of gear-wheels mounted on the intermediate shaft adapted to rotate in unison and prevented from longitudinal movement, said driven shaft being geared to said gears, a sleeve on the driving shaft and a plurality of pinions thereon arranged to be thrown into mesh with the gear wheels on the intermediate shaft.

2. In combination, a driving shaft, a driven shaft, and an intermediate shaft, gears on said intermediate shaft adapted to rotate in unison and prevented from longitudinal movement, a sliding sleeve on the driven shaft, a series of gears on said sleeve, arranged to mesh with the gears on the intermediate shaft, a sleeve arranged to slide on the driving shaft, a series of gears thereon arranged to mesh with the gears on said intermediate shaft, and means for shifting the sleeves so as to change the speed of the driven shaft.

In testimony whereof we affix our signature in presence of two witnesses.

RICHD. K. LE BLOND.
WILLIAM F. GROENE.

Witnesses:
 GRACE PUGH,
 NASON P. PRITCHARD.